US012122107B2

(12) United States Patent
Chou et al.

(10) Patent No.: US 12,122,107 B2
(45) Date of Patent: Oct. 22, 2024

(54) COMPOSITE MATERIAL AND METHOD FOR MOLDING COMPOSITE MATERIAL

(71) Applicant: FORMOSA PLASTICS CORPORATION, Kaohsiung (TW)

(72) Inventors: Chien-Hsu Chou, Kaohsiung (TW); Chih-Hsiang Liang, Kaohsiung (TW); Long-Tyan Hwang, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 113 days.

(21) Appl. No.: 17/896,949

(22) Filed: Aug. 26, 2022

(65) Prior Publication Data

US 2023/0060196 A1 Mar. 2, 2023

(30) Foreign Application Priority Data

Aug. 27, 2021 (TW) ................................. 110131955

(51) Int. Cl.
*B29C 70/46* (2006.01)
*B29C 70/54* (2006.01)
*B29K 105/08* (2006.01)

(52) U.S. Cl.
CPC .............. *B29C 70/46* (2013.01); *B29C 70/54* (2013.01); *B29K 2105/0845* (2013.01); *B29K 2105/089* (2013.01); *B29K 2995/0072* (2013.01)

(58) Field of Classification Search
CPC ....... B29C 70/44; B29C 70/46; B29C 70/542; B29K 2105/0845; B29K 2105/089
See application file for complete search history.

(56) References Cited

U.S. PATENT DOCUMENTS

| 2003/0227107 | A1 | 12/2003 | Stewart |
| 2018/0036969 | A1 | 2/2018 | Gam |
| 2020/0016852 | A1 | 1/2020 | Jung et al. |
| 2020/0180240 | A1 | 6/2020 | Echle et al. |

FOREIGN PATENT DOCUMENTS

| CN | 102765198 | A | 11/2012 |
| CN | 212400406 | U | 1/2021 |
| CN | 113059827 | A | 7/2021 |
| JP | H10156853 | A | 6/1998 |
| JP | 2003298241 | A | 10/2003 |

*Primary Examiner* — Jerzi H Moreno Hernandez
(74) *Attorney, Agent, or Firm* — Muncy, Geissler, Olds & Lowe, P.C.

(57) ABSTRACT

The present application relates to a composite material and a method for molding the same. Firstly, components to be pressed is disposed in a gas-isolation element, and located between two pressing plates. Next, a plate is disposed based on a location of a prepreg element of the components, and then a hot pressing step is performed. After the hot pressing step, a cooling step is performed, thereby producing the composite material of the present application. A dimension of the composite material can be easily adjusted to meet requirements of various applications.

11 Claims, 6 Drawing Sheets

COMPOSITE MATERIAL AND METHOD FOR MOLDING COMPOSITE MATERIAL

RELATED APPLICATIONS

This application claims priority to Taiwan Application Serial Number 110131955, filed Aug. 27, 2021, which is herein incorporated by reference in its entirety.

BACKGROUND

Field of Invention

The present application relates to a composite material and a method for molding the same. More particularly, the present application provides a composite material with various thicknesses and a method for conveniently molding the same.

Description of Related Art

In order to meet the requirements of various applications, the research of material technology has been rapidly developed. However, the requirements of material properties are tending to be severe as the developments of the applications. Accordingly, composite materials that blend various materials to combine properties of the materials are vigorously developed. Because carbon fiber materials have light weight and good mechanical properties (such as strength, modulus and like), they are often used as a reinforcing material for the composite materials.

The composite materials generally are formed by liquid molding methods (such as resin transfer molding (RTM), vacuum-assisted RTM, resin infusion (RI) or the like), pressure molding methods (such as a hot pressing apparatus), spraying, hand and spray lay-up, autoclave molding and the like. The molding with the hot pressing apparatus has higher operational convenience and efficiency, and the composite material produced by the autoclave molding has better properties and quality.

However, a mold is used in the molding with the hot pressing apparatus to adjust dimensions of the composite material, and therefore there is a need to enlarge the mold as an enlargement of the dimensions of the composite material. The enlarged mold is heavier, thus lowering convenience of the process. Furthermore, it is necessary to replace the mold when the composite materials with different specifications are to be produced, thereby increasing risks for operators to move the mold. The equipment for the autoclave molding is more complicated, and therefore racing and lowering for temperature of the equipment takes more time, thereby increasing cost of the composite materials. Besides, autoclave molding is applied to produce the composite materials under parameters of high temperature and high pressure, such that the system has higher instability and higher environmental risk.

Accordingly, there is an urgent need to provide a method for molding the composite material for improving the defects that the conventional molding process is not conveniently applicable to fabricate the composite materials with various dimensions.

SUMMARY

Therefore, an aspect of the present application is to provide a method for molding a composite material. The method can conveniently produce composite materials with various thicknesses by disposing a plate element and a dimension control element.

Another aspect of the present application is to provide a composite material. The composite material is manufactures by the aforementioned molding method.

According to an aspect of the present application, a method for molding a composite material is provided. In this molding method, a component to be pressed is firstly placed in a gas-isolation element and between an upper pressing plate and a lower pressing plate. The component to be pressed includes a prepreg element, a sealing element and at least one dimension control element. In a plane perpendicular to the pressing direction, the sealing element surrounds the prepreg element. The sealing element has a discharge channel. The sealing element is disposed between the prepreg element and the dimension control element. Then, corresponding to a position of the prepreg element, a plate element is placed between the gas-isolation element and the upper pressing plate. And then, a hot pressing step is performed by the upper pressing plate and the lower pressing plate. After the hot pressing step is performed, a cooling step is performed to produce the composite material.

According to some embodiments of the present application, a height of the aforementioned sealing element is not lower than a height of the prepreg element.

According to some embodiments of the present application, a width of the aforementioned discharge channel is 2 mm to 20 mm.

According to some embodiments of the present application, the discharge channel penetrates the sealing element along a direction perpendicular to the aforementioned pressing direction.

According to some embodiments of the present application, a number of the aforementioned dimension control elements is even, and each of the dimension control elements is disposed opposite to another.

According to some embodiments of the present application, a height of each of the aforementioned dimension control elements is equal to the sum of heights of the composite material and the plate element.

According to some embodiments of the present application, along the aforementioned pressing direction, a projection area of the prepreg element completely falls within a projection area of the plate element.

According to some embodiments of the present application, along the aforementioned pressing direction, a projection area of the component to be pressed is located in a pressing area of the upper pressing plate.

According to some embodiments of the present application, a surface roughness of the aforementioned upper pressing plate, the lower pressing plate and the plate element is 25 nm to 75 nm.

According to some embodiments of the present application, before the aforementioned operation of performing the hot pressing step, the method selectively comprises an operation of performing a gas bleeding step to extract a gas in the gas-isolation element.

According to another aspect of the present application, a composite material is provided. The composite material is produced by the aforementioned molding method, and a porosity of the composite material is not greater than 1%.

According to another aspect of the present application, a method for molding a composite material is provided. In this molding method, a component to be pressed is firstly placed in a gas-isolation element and between an upper pressing plate and a lower pressing plate. The component to be pressed includes a prepreg element, a sealing element and at least one dimension control element. The sealing element is formed from a material that is compressively deformed by a pressure. In a plane perpendicular to the pressing direction, the sealing element surrounds the prepreg element. The sealing element has a discharge channel. The sealing element is disposed between the prepreg element and the dimension control element. Then, a plate element is placed between the gas-isolation element and the upper pressing plate. A projection area of the plate element and a projection area of the sealing element are not overlapped along the pressing direction. And then, a hot pressing step is performed by the upper pressing plate and the lower pressing plate. After the hot pressing step is performed, a cooling step is performed to produce the composite material.

According to some embodiments of the present application, a height of the sealing element is higher than a height of the at least one dimension control element.

According to some embodiments of the present application, a projection area of the prepreg element completely falls within the projection area of the plate element along the pressing direction.

According to some embodiments of the present application, the aforementioned discharge channel penetrates the sealing element along a direction perpendicular to the pressing direction.

According to some embodiments of the present application, a projection area of the component to be pressed is located in a pressing area of the upper pressing plate along the pressing direction.

According to some embodiments of the present application, there is a space between the prepreg element and the sealing element in the gas-isolation element before the hot pressing step is performed.

According to some embodiments of the present application, before the aforementioned operation of performing the hot pressing step, the method selectively comprises an operation of performing a gas bleeding step to extract a gas in the gas-isolation element.

According to some embodiments of the present application, the aforementioned sealing element is deformed during the hot pressing step, and thereby the discharge channel is closed.

According to some embodiments of the present application, the aforementioned cooling step is performed under a situation that a pressure applied by the upper pressing plate is maintained.

In the composite material and the method for molding the same of the present application, dimensions of the composite material can be conveniently controlled by disposing the dimension control elements and the plate element, thereby meeting requirements. Moreover, in order to meet requirements of mechanical properties, the component to be pressed of the present application includes the sealing element surrounding the prepreg element, such that an outflow rate of a resin material can be efficiently controlled during the hot pressing step. Accordingly, the manufacturing method of the present application can effectively produce the composite material gives consideration to dimensional requirements and mechanical properties. Controlling dimensions of the composite material can be conveniently achieved by adjusting the dimension control element and/or the plate element, and therefore a hot pressing apparatus can be applied to produce composite materials with different specifications, and it is unnecessary to perform additional modifications.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
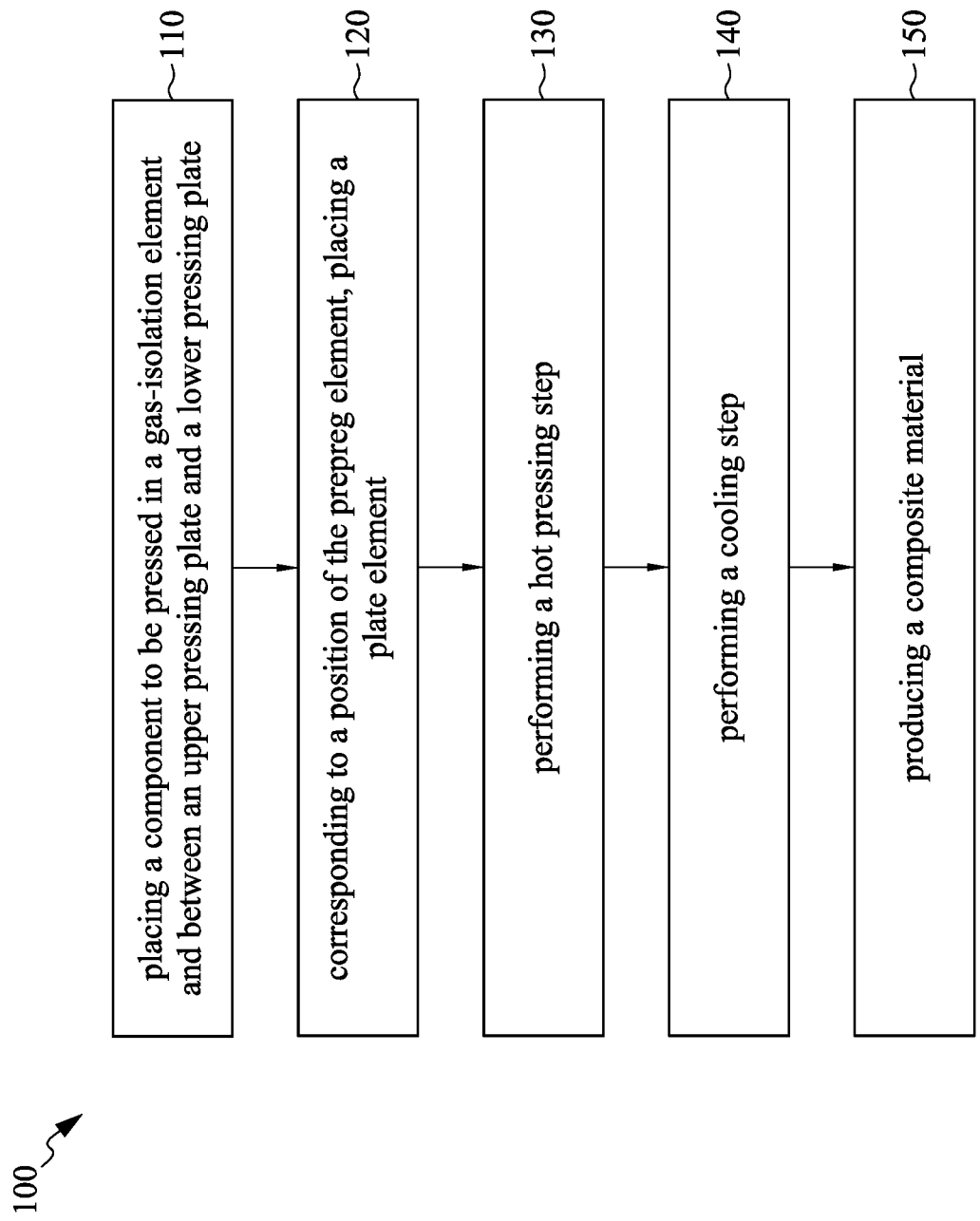
FIG. 1 illustrates a flow chart of a method for molding a composite material according to some embodiments of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, it illustrates a flow chart of a method for molding a composite material according to some embodiments of the present invention. In the method 100, a component to be pressed is firstly placed in a gas-isolation element, and the component to be pressed is disposed between an upper pressing plate and a lower pressing plate, shown as operation 110.

Figure 2A:
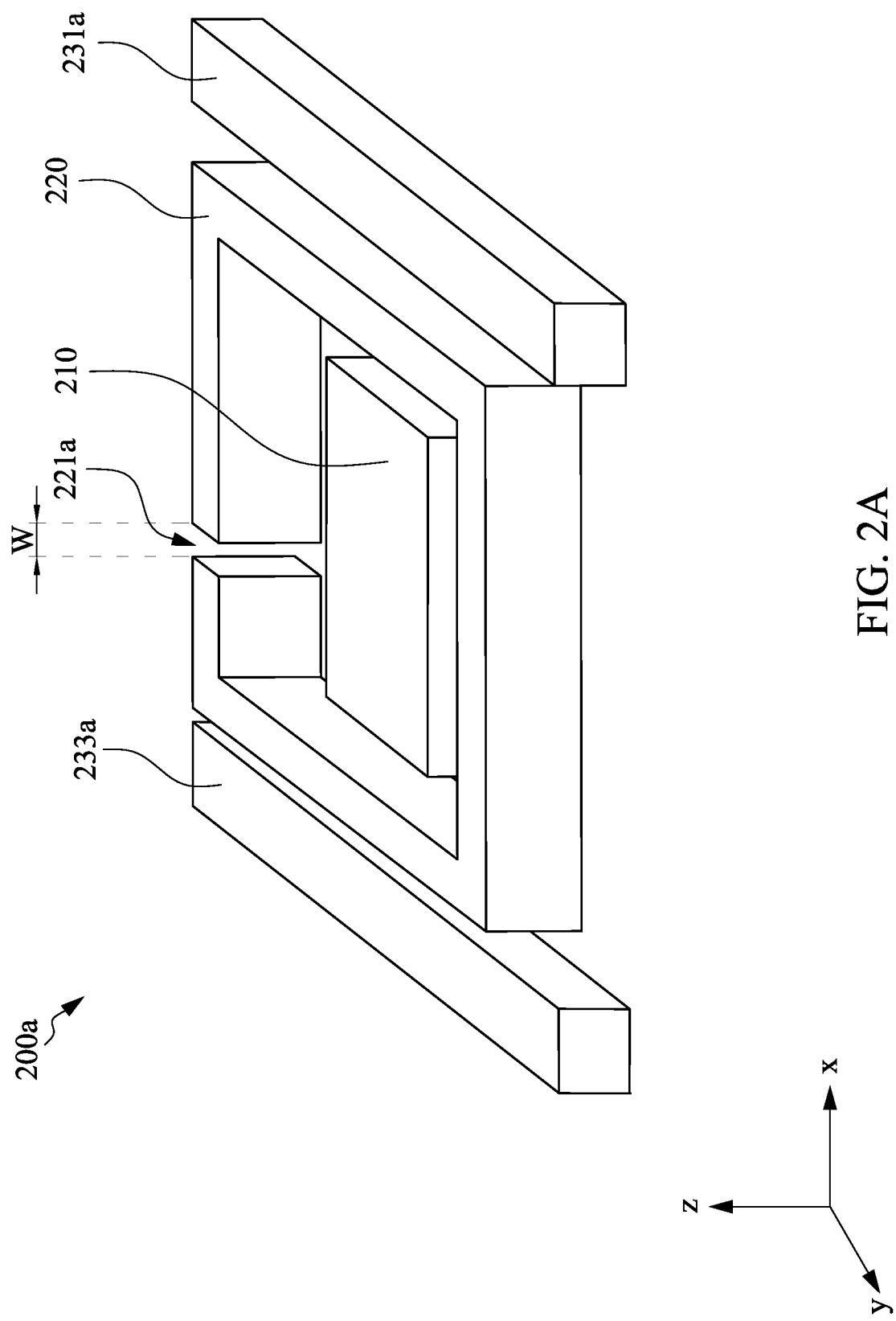
FIG. 2A illustrates a three-dimensional view of a component to be pressed according to some embodiments of the present application.

Referring to FIG. 2A, it illustrates a three-dimensional view of a component to be pressed according to some embodiments of the present application. The component to be pressed 200a includes a prepreg element 210, a sealing element 220 and dimension control elements 231a and 233a. In the x-y plane, the sealing element 220 surrounds the prepreg element 210, and the sealing element 220 is disposed between the prepreg element 210 and the dimension control elements 231a and 233a. The sealing element 220 may have a discharge channel 221a.

The prepreg element 210 may be fiber materials which have been impregnated with a resin material. In some embodiments, the prepreg element 210 may be, for example, a stack formed of multiple layers of fiber cloths which have been impregnated with the resin material. In some examples, the fiber materials can include but be not limited to rayon materials, natural fiber materials and/or other suitable fiber materials, and the resin material can include but be not limited to epoxy resin, vinyl ester resin (VE), bismaleimide (BMI), phenolic resin and/or other suitable thermosetting resin materials. For example, the fiber materials can be carbon fiber materials, and the fiber materials may be unidirectional (UD) fibers and woven fabrics (e.g. 3K, 6K, 12K, 24K and 48K woven fabrics).

The sealing element 220 is a material that can be compressively deformed by pressure. There are not limitations to the shape of the sealing element 220 as long as the prepreg element 210 can be surrounded by the sealing element 220. As shown in FIG. 2A, although a projection shape of the prepreg element 210 on the x-y plane is a quadrilateral, and the sealing element 220 is a square frame, the present application is not limited to this. In other embodiments, the projection shape of the prepreg element 210 on the x-y plane can be any shapes to meet requirements of applications, but the sealing element 220 can still be a square frame, or the sealing element 220 can be a frame body that can change with the shape of the prepreg element 210.

Figure 2B:
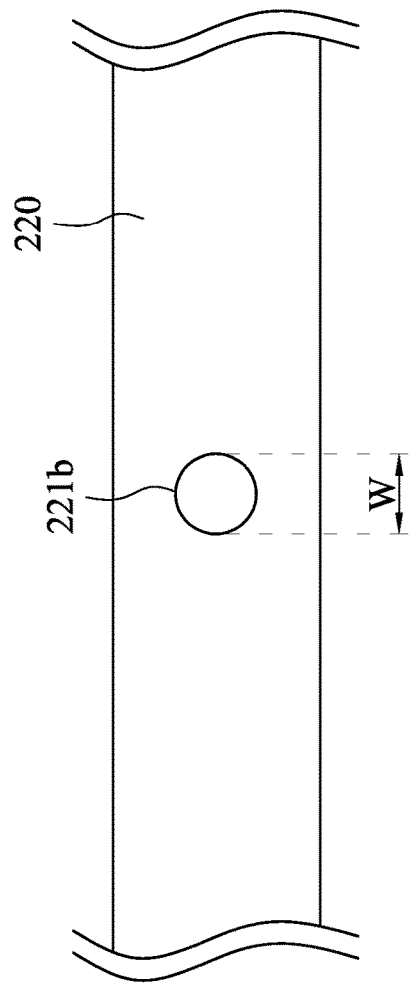
FIG. 2B and FIG. 2C respectively illustrates a side view of a sealing element according to some embodiments of the present application.
Figure 2C:
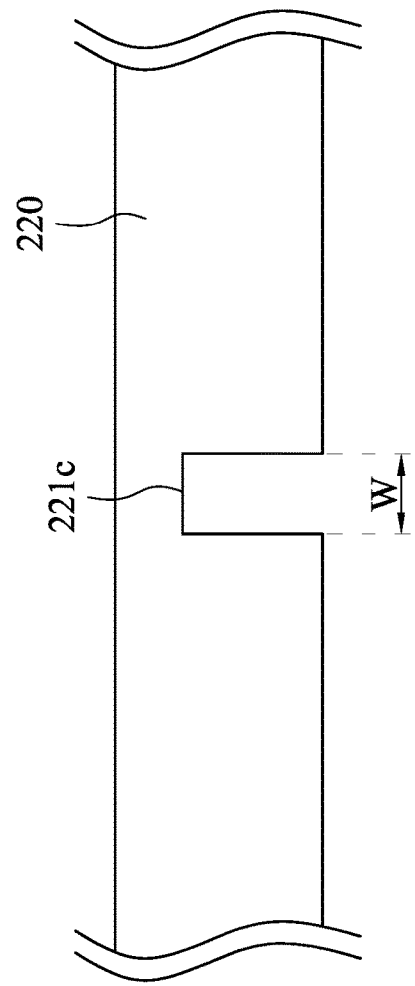

There are no specific limitations to the location of the discharge channel 221a of the sealing element 220 as long as it can penetrate the sealing element 220 to allow excess materials extruded in the subsequent hot pressing step to be discharged. In some embodiments, width W of the discharge channel 221a may be 2 mm to 20 mm, and preferably be 2 mm to 10 mm. When the width of the discharge channel 221a is within the aforementioned range, the aforementioned excess materials can be easily discharged. In FIG. 2A, the sealing element 220 is not a continuous frame due to the disposition of the discharge channel 221a, but the present application is not limited thereto. In other embodiments, referring to FIG. 2B and FIG. 2C, and they respectively illustrates a side view of a sealing element according to some embodiments of the present application. The discharge channel 221b of the sealing element 220 can be a circular channel (as shown in FIG. 2B), or the discharge channel 221c is a groove structure disposed on a bottom surface of a side wall of the sealing element 220 (as shown in FIG. 2C). In some embodiments, in order to obtain a better discharging effect, and further the sealing element 220 will be deformed under pressure, such that a distance between the sealing element 220 and the prepreg element 210 can be 0 mm to 5 mm, and preferably be 0 mm to 2 mm.

Referring to FIG. 2A. The dimension control elements 231a and 233a are both components that are not deformed under pressure. It is noted that the components that are not deformed under pressure means that dimensions of the components will not vary under the pressure applied during the following hot pressing step. In some examples, the dimension control elements 231a and 233a are formed from metal materials, polymer materials, and/or other suitable materials. In some embodiments, corresponding to the dimensions of the composite material to be produced, a deviation of dimensions of the dimension control elements 231a and 233a is controlled to be not greater than 0.02 mm. It is easily to control the dimensions of the composite materials with the disposition of the dimension control elements 231a and 233a when the following hot pressing step is performed. In some embodiments, the component to be pressed 200a can selectively include other additional dimension control elements except the dimension control elements 231a and 233a. However, a number of the other additional dimension control elements is even for better hot pressing effect, and each of the dimension control elements and another one are disposed on opposite sides of the prepreg element 210, for example, the arrangement of the dimension control elements 231a and 233a. Similarly, a distance between the sealing element 220 and the dimension control elements 231a and 233a may be 0 mm to 5 mm, and preferably be 0 mm to 2 mm.

In the z-axis direction, a height of the sealing element 220 is not lower than a height of the prepreg element 210. Preferably, the height of the sealing element 220 is higher than the height of the prepreg element 210. Further, the height of the sealing element 220 is higher than the heights of the dimension control elements 231a and 233a.

Figure 2D:
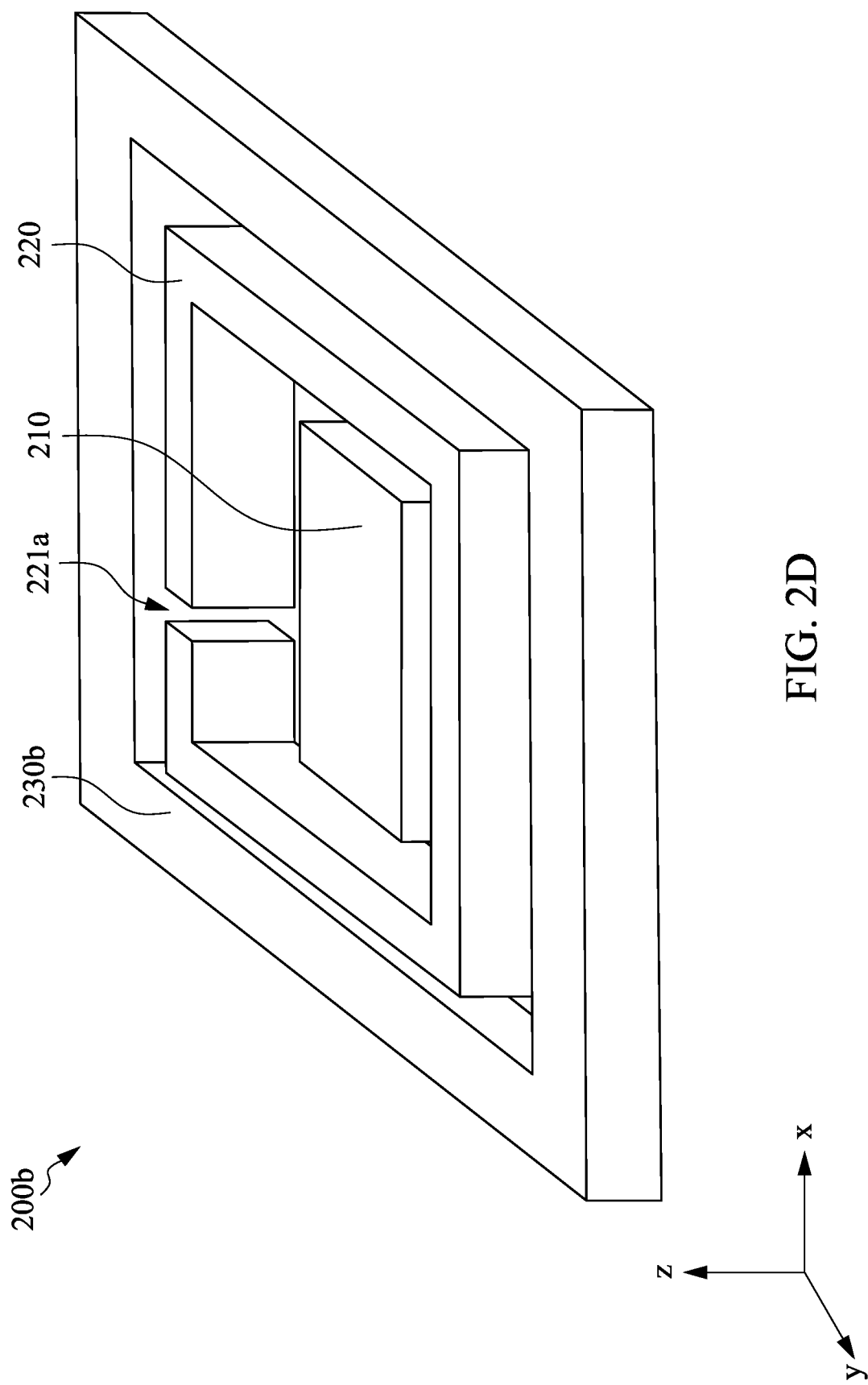
FIG. 2D illustrates a three-dimensional view of a component to be pressed according to some embodiments of the present application.

Referring to FIG. 2D, and it illustrates a three-dimensional view of a component to be pressed according to some embodiments of the present application. The component to be pressed 200b is substantially similar to the component to be pressed 200a in configuration, but the difference therebetween resides in that the component to be pressed 200b includes a dimension control element 230b, and the dimension control element 230b surrounds the sealing element 220.

Figure 3A:
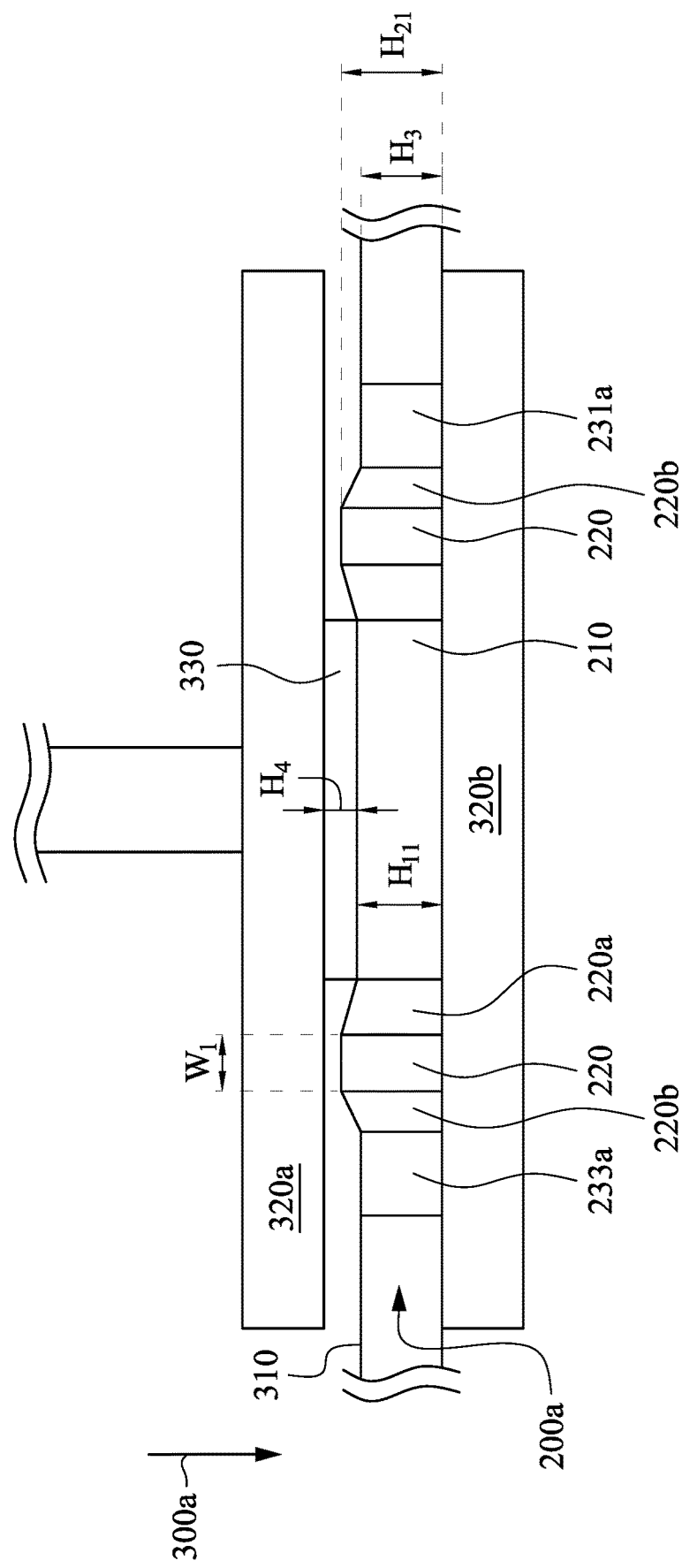
FIG. 3A illustrates a cross-sectional view of a hot pressing apparatus before a hot pressing step is performed according to some embodiments of the present application.

Referring to FIG. 1, FIG. 2A and FIG. 3A simultaneously, and FIG. 3A illustrates a cross-sectional view of a hot pressing apparatus before a hot pressing step is performed according to some embodiments of the present application. During the operation 110, the component to be pressed 200a is placed in the gas-isolation element 310 and disposed between the upper pressing plate 320a and the lower pressing plate 320b. There are not specific limitations to materials of the gas-isolation element 310 as long as it can efficiently block the gas and not be broken during the following hot pressing step. In some examples, the gas-isolation element 310 can be a vacuum bag. When the component to be pressed 200a is placed in the gas-isolation element 310, the gas-isolation element 310 flatly and directly contacts a top surface and a bottom surface of the prepreg element 210 for preventing the composite materials from having lined surface, and the gas-isolation element 310 also flatly and directly contacts top surfaces and bottom surfaces of the sealing element 220 and the dimension control elements 231a and 233a for enhancing hot pressing effect. A projection area of the component to be pressed 200a projected along the z-axis direction (i.e. a pressing direction 300a of the hot pressing step) is within a pressing area of the upper pressing plate 320a for improving pressing effect of the following hot pressing step.

After the operation 110 is performed, the plate element 330 is placed corresponding to a position of the prepreg element 210, shown as operation 120. A projection area of the prepreg element 210 projected along the pressing direction 300a is completely within a projection area of the plate element 330 to obtain better hot pressing effect. In other words, the upper surface of the prepreg element 210 is completely covered by the plate element 330. Preferably, the plate element 330 has a projection area corresponding to the prepreg element 210 along the pressing direction 300a. The projection area of the sealing element 220 and the projection area of the plate element 330 are not overlapped along the pressing direction 300a to avoid that the dimensions of the composite materials cannot meet the requirements. In some embodiments, the bottom surface of the plate element 330 and the top surface of the lower pressing plate 320b can selectively have surface undulations to subject the composite materials to include a non-planar surface profile corresponding to the surface undulations, and/or an additional component is disposed on the top surface of the lower pressing plate 320b to subject the composite materials to include a non-planar surface profile. However, it should be noted that the dimensional requirements of the composite materials are also be considered when the additional component is disposed.

Before the following hot pressing step is performed, a height $H_{11}$ of the prepreg element 210 is lower than a height $H_{21}$ of the sealing element 220, the height $H_{21}$ of the sealing element 220 is higher than heights $H_3$ of the dimension control elements 231a and 233a, and the sealing element 220 without being deformed by compression has a width $W_1$. In some embodiments, in order to allow the sealing element 220 to be deformed during the hot pressing step, there is a space 220a between the sealing element 220 and the prepreg element 210, and there is also a space 220b between the sealing element 220 and the dimension control elements 231a and 233a.

In some embodiments, after the operation 120 is performed, a gas bleeding step is selectively performed to extract the gas in the gas-isolation element 310, and thereby flatness of the prepreg element 210, the sealing element 220 and the dimension control elements 231a and 233a resulted from the gas-isolation element 310 is improved. Simultaneously, a portion of the excess resin materials in the prepreg element 210 can be discharged through the discharge channel 221a (shown in FIG. 2A) of the sealing element 220.

Figure 3B:
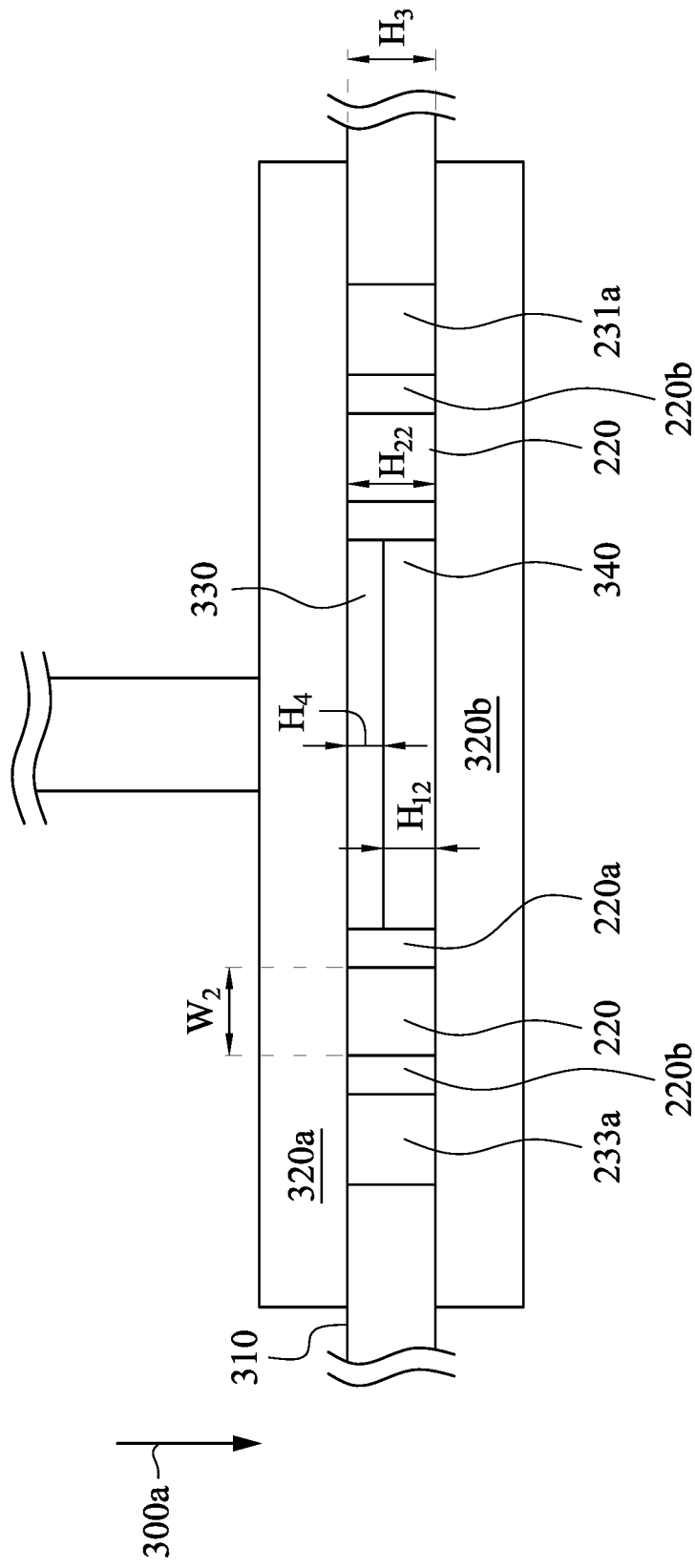
FIG. 3B illustrates a cross-sectional view of the hot pressing apparatus after the hot pressing step is performed according to some embodiments of the present application.

Referring to FIG. 1, FIG. 3A and FIG. 3B simultaneously, and FIG. 3B illustrates a cross-sectional view of the hot pressing apparatus after the hot pressing step is performed according to some embodiments of the present application. After the operation 120 is performed, the hot pressing step and the cooling step are performed to produce the composite material 340, shown as operations 130 to 150. When the hot pressing step is performed, the upper pressing plate 320a is pressed down along the pressing direction 300a, and the prepreg element 210 is pressed down by the plate element 330 until the upper pressing plate 320a pressed against the dimension control elements 231a and 233a, and thereby the uncooled composite material 340 is obtained. In some embodiments, a surface roughness of the upper pressing plate 320a, the lower pressing plate 320b and the plate element 330 is 25 nm to 75 nm for improving surface quality of the composite material 340, and preferably the surface roughness thereof is 25 nm to 50 nm. In some examples, the upper pressing plate 320a and the lower pressing plate 320b can be formed from SKD series, SUS series and/or SCM series steel, and the plate element 330 can be formed from aluminum metal. High temperature heat energy applied in the hot pressing step can subject the resin materials in the prepreg element 210 to have fluidity, and therefore the excess resin materials can be discharged through the discharge channel 221a (shown in FIG. 2A) of the sealing element 220 as the lowering of the upper pressing plate 320a, and further air bubbles in the materials are brought out with the flowing of the resin materials, thereby reducing pores in the composite materials 340 and enhancing quality thereof. Because the excess resin materials and the pores can be eliminated, it is unnecessary to use high-pressure gas in the method of the present application, and the obtained composite material 340 can have better surface quality and mechanical properties to meet the requirements of the application without further performing a processing step.

Before and during the hot pressing step is performed, the height $H_{11}$ of the prepreg element 210 is lower than the initial height $H_{21}$ of the sealing element 220, and thus the resin materials merely flow out from the discharge channel 221a rather than other positions. Accordingly, a total outflow rate of the materials can be easily adjusted, and thereby properties of the composite materials 340 are controlled.

Further, the pressure applied by the upper pressing plate 320a also causes the sealing element 220 to be deformed, and therefore the compressed sealing element 220 has a lower height $H_{22}$ and a wider width $W_2$. Because the prepreg element 210 and the dimension control elements 231a and 233a are fixed, the space 220a and the space 220b are both reduced as the deformation of the sealing element 220 to compared with those before the hot pressing step is performed. Based on the compression deformation of the sealing element 220, the discharge channel 221a (FIG. 2A) will also be closed due to the deformation, such that the resin materials with fluidity will not further flow out, thereby maintaining the quality and mechanical properties of the composite material 340. In some embodiments, the total outflow rate of the aforementioned resin materials is not greater than 20% in the method 100 of the present application. When the total outflow rate of the resin materials is not greater than 20%, the composite material 340 has more suitable fiber content, and thereby dimensions and mechanical properties required in the application can simultaneously be met.

When the upper pressing plate 320a is pressed against the dimension control elements 231a and 233a, the upper pressing plate 320a cannot be further pressed down, and therefore a difference between the height $H_3$ of the dimension control elements 231a and 233a and the height $H_4$ of the plate element 330 is the height $H_{12}$ of the obtained composite material 340. In other words, the composite materials with various dimensions can be conveniently produced with the method 100 of the present application by adjusting the height $H_4$ of the plate element 330.

The aforementioned cooling step is performed to cool the uncooled composite material 340 to 70° C. under a situation that the pressure applied by the upper pressing plate 320a is maintained, and further a demolding step is performed to obtain the composite material. In some examples, the composite material 340 manufactured by the present application contains 53% to 63% of fiber materials, and its porosity is not greater than 1%. The coefficient of variation (CV) of mechanical properties of the composite material 340 is not more than 5%. When the composite material 340 contains 60% of the fiber materials, tensile strength of the composite material 340 with a general modulus (36 msi) is not less than 2100 MPa, and tensile strength of the composite material with an intermediate modulus (42 msi) is not less than 2200 MPa, in these examples.

Several embodiments are described below to illustrate the application of the present application. However, these embodiments are not used for limiting the present application. For those skilled in the art of the present application, various variations and modifications can be made without departing from the spirit and scope of the present application.

Preparation Embodiment 1

A 3K woven prepreg and a UD fiber prepreg made of vinyl resin were laminated to obtain a stack. Then, the component to be pressed containing the stack, a sealing rubber strip and two dimension control sheets was placed in a vacuum bag, and the component to be pressed was placed on a central area of the mirror-surface pressing iron plate. The dimension control sheets were respectively placed on opposite sides of the stack and on the corresponding two sides, and the sealing rubber strip was located between the stack and the dimension control sheets. Moreover, a distance between the sealing rubber strip and the stack and a distance between the sealing rubber strip and the adjacent dimension control sheet can be independently 3 mm to 20 mm. Next, the gas in the vacuum bag was bled, such that the vacuum bag was flatly on the component to be pressed. An aluminum plate was placed corresponding to a position of the stack, and a hot pressing step was performed by the two mirror-surface pressing iron plate in a vacuum state based on curing properties of a resin material. After the hot pressing step was performed, the pressurized state of the mirror-surface pressing iron plates was maintained, and a cooling step was performed to cool to less than or equal to 70° C. After demolding, the composite material of Preparation Embodiment 1 can be obtained.

Preparation Embodiment 2 to Preparation Embodiment 4

Preparation Embodiment 2 to Preparation Embodiment 4 were practiced with the same method as in Preparation Embodiment 1 by using various resin materials and kinds of the prepreg. The stack of Preparation Embodiment 2 was formed from 3K woven prepreg and the UD fiber prepreg, and the prepreg both were made of epoxy resin. The stack of Preparation Embodiment 3 was obtained by laminating UD fiber prepreg with multi-angles (such as the angle was 0°, 90°, +45° and −45°), and the UD fiber prepreg was made of epoxy resin. The stack of Preparation Embodiment 4 was obtained by laminating UD fiber prepreg with a single angle, and the UD fiber prepreg was made of epoxy resin.

Embodiment 1

The method for producing the composite material (glass transition temperature was 150° C.) of Preparation Embodiment 2 was adopted by Embodiment 1. During the hot pressing step, temperature was 150° C., pressure was 7.5 kg, and pressing period was 60 minutes. The obtained composite material was further subjected to evaluation methods of mechanical properties such as tensile, bending and compression, and coefficients of variation of the evaluation results all were controlled to be not more than 5%. Besides, porosity of the composite material was 0.37%.

Embodiment 2 to Embodiment 7

The method for producing the composite material (glass transition temperature was 180° C.) of Preparation Embodiment 2 was adopted by Embodiment 2. During the hot pressing step, temperature was 180° C., pressure was 7.5 kg, and pressing period was 120 minutes. Coefficients of variation of the mechanical properties such as tensile, bending and compression of the composite material all were controlled to be not more than 5%, and porosity of the composite material was 0.29%.

The method for producing the composite material (glass transition temperature was 180° C.) of Preparation Embodiment 3 was adopted by Embodiment 3. During the hot pressing step, temperature was 180° C., pressure was 7.5 kg, and pressing period was 180 minutes. The obtained composite material was further subjected to evaluation methods of mechanical properties such as unnotched tension and compression. Coefficients of variation thereof both were controlled to be not more than 5%, and porosity of the composite material was 0.40%.

The method for producing the composite material (glass transition temperature was 180° C.) of Preparation Embodiment 3 was adopted by Embodiment 4. During the hot pressing step, temperature was 180° C., pressure was 5.0 kg, and pressing period was 180 minutes. The obtained composite material was further subjected to an evaluation method of open hole compression test. A coefficient of variation thereof was controlled to be not more than 3%, and porosity of the composite material was 0.35%.

The method for producing the composite material (glass transition temperature was 150° C.) of Preparation Embodiment 4 was adopted by Embodiment 5. During the hot pressing step, temperature was 150° C., pressure was 2.5 kg, and pressing period was 30 minutes. Coefficients of variation of the mechanical properties such as tensile, bending and short-beam of the obtained composite material all were controlled to be not more than 5%, and porosity of the composite material was 0.23%. The measurement of the short-beam mechanical property was evaluated with a standard method of American Society for Testing and Materials (ASTM) No. D2344.

The method for producing the composite material (glass transition temperature was 180° C.) of Preparation Embodiment 4 was adopted by Embodiment 6. During the hot pressing step, temperature was 180° C., pressure was 5.0 kg, and pressing period was 180 minutes. Coefficients of variation of the mechanical properties such as tensile, bending and short-beam of the obtained composite material all were controlled to be not more than 5%, and porosity of the composite material was 0.25%.

The method for producing the composite material (glass transition temperature was 150° C.) of Preparation Embodiment 4 was adopted by Embodiment 7. During the hot pressing step, temperature was 150° C., pressure was 5.0 kg, and pressing period was 60 minutes. Coefficients of variation of the mechanical properties such as tensile, bending and short-beam of the obtained composite material all were controlled to be not more than 4%, and porosity of the composite material was 0.19%.

Accordingly, the method of the present application can adjust the size of the dimension control element to conveniently control the dimensions of the obtained composite material. Furthermore, the method of the present application can control the outflow rate of the excess resin materials with the discharge channel of the sealing element. Simultaneously, the air bubbles in the materials can be eliminated by the flowing of the resin materials, and therefore the composite material can meet the dimensional requirements and have appropriate mechanical properties to meet the application requirements. Besides, a release agent is excluded in the method of the present application with the configuration of the gas-isolation element, thereby improving the convenience of the manufacturing process and reducing the cost.

As is understood by a person skilled in the art, the foregoing preferred embodiments of the present application are illustrated of the present application rather than limiting of the present application. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A method for molding a composite material, comprising:
   placing a component to be pressed in a gas-isolation element and between an upper pressing plate and a lower pressing plate, wherein the component to be pressed includes:
   a prepreg element;
   a sealing element; and
   at least one dimension control element, and
   in a plane perpendicular to a pressing direction, the sealing element surrounds the prepreg element, the sealing element has a discharge channel, and the sealing element is disposed between the prepreg element and the at least one dimension control element;
   corresponding to a position of the prepreg element, placing a plate element between the gas-isolation element and the upper pressing plate;

performing a hot pressing step by the upper pressing plate and the lower pressing plate; and performing a cooling step to produce the composite material.

2. The method for molding the composite material of claim 1, wherein a height of the sealing element is not lower than a height of the prepreg element.

3. The method for molding the composite material of claim 1, wherein a width of the discharge channel is 2 mm to 20 mm.

4. The method for molding the composite material of claim 1, wherein the discharge channel penetrates the sealing element along a direction perpendicular to the pressing direction.

5. The method for molding the composite material of claim 1, wherein a number of the at least one dimension control element is even, and each of the at least one dimension control element is disposed opposite to another.

6. The method for molding the composite material of claim 1, wherein a height of each of the at least one dimension control element is equal to a sum of heights of the composite material and the plate element.

7. The method for molding the composite material of claim 1, wherein a projection area of the prepreg element completely falls within a projection area of the plate element along the pressing direction.

8. The method for molding the composite material of claim 1, wherein a projection area of the component to be pressed is located in a pressing area of the upper pressing plate along the pressing direction.

9. The method for molding the composite material of claim 1, wherein a surface roughness of the upper pressing plate, the lower pressing plate and the plate element is 25 nm to 75 nm.

10. The method for molding the composite material of claim 1, before the operation of performing the hot pressing step, the method further comprises:

performing a gas bleeding step to extract a gas in the gas-isolation element.

11. The method for molding the composite material of claim 1, wherein a porosity of the composite material is not greater than 1%.

* * * * *